(12) United States Patent
De Pena et al.

(10) Patent No.: US 11,014,296 B2
(45) Date of Patent: May 25, 2021

(54) ADDITIVE MANUFACTURING TRANSPORT DEVICES

(71) Applicant: HEWLETT-PACKARD DEVELOPMENT COMPANY, L.P., Houston, TX (US)

(72) Inventors: Alejandro Manuel De Pena, Sant Cugat del Valles (ES); Fernando Juan, Sant Cugat del Valles (ES); Esteve Comas, Sant Quirze del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 190 days.

(21) Appl. No.: 16/095,244

(22) PCT Filed: May 12, 2016

(86) PCT No.: PCT/EP2016/060658
§ 371 (c)(1),
(2) Date: Oct. 19, 2018

(87) PCT Pub. No.: WO2017/194111
PCT Pub. Date: Nov. 16, 2017

(65) Prior Publication Data
US 2020/0114576 A1   Apr. 16, 2020

(51) Int. Cl.
*B29C 64/20* (2017.01)
*B29C 64/255* (2017.01)
(Continued)

(52) U.S. Cl.
CPC .......... *B29C 64/188* (2017.08); *B29C 64/205* (2017.08); *B29C 64/227* (2017.08);
(Continued)

(58) Field of Classification Search
None
See application file for complete search history.

(56) References Cited

U.S. PATENT DOCUMENTS 6,554,600 B1 * 4/2003 Hofmann .............. B29C 64/259
                                                    425/174.4
7,357,629 B2 * 4/2008 Weiskopf .............. B29C 64/153
                                                    425/188
(Continued)

FOREIGN PATENT DOCUMENTS

DE    102009036153    2/2011
EP        1700686      9/2006
(Continued)

OTHER PUBLICATIONS

International Search Report and Written Opinion for International Application No. PCT/EP2016/060658, dated Jan. 31, 2017, 11 pages.
(Continued)

*Primary Examiner* — Jacob T Minskey
*Assistant Examiner* — Baileigh Kate Darnell
(74) *Attorney, Agent, or Firm* — HP Inc. Patent Department

(57) ABSTRACT

A transport device (106) includes a first volume (110) to receive a build material and a second volume (108) to contain an object created by an additive manufacturing system (100). The transport device (106) is receivable by a 3D printer (102) of the additive manufacturing system, and the 3D printer to build the object in the second volume. The transport device (106) is receivable by an extracting and supply device (104). The extracting and supply device is to extract the object from the second volume and to supply the build material to the first volume.

20 Claims, 9 Drawing Sheets

(51) Int. Cl.
  *B29C 64/35* (2017.01)
  *B29C 64/188* (2017.01)
  *B29C 64/379* (2017.01)
  *B29C 64/357* (2017.01)
  *B29C 64/245* (2017.01)
  *B29C 64/393* (2017.01)
  *B29C 64/227* (2017.01)
  *B29C 64/205* (2017.01)
  *B33Y 10/00* (2015.01)
  *B33Y 30/00* (2015.01)
  *B33Y 50/02* (2015.01)
  *B33Y 40/20* (2020.01)

(52) U.S. Cl.
  CPC .......... *B29C 64/245* (2017.08); *B29C 64/255* (2017.08); *B29C 64/357* (2017.08); *B29C 64/379* (2017.08); *B29C 64/393* (2017.08); *B33Y 10/00* (2014.12); *B33Y 30/00* (2014.12); *B33Y 40/20* (2020.01); *B33Y 50/02* (2014.12)

(56) References Cited

U.S. PATENT DOCUMENTS

| | | | |
|---|---|---|---|
| 7,520,740 B2 * | 4/2009 | Wahlstrom | B29C 64/135 425/186 |
| 8,642,692 B1 | 2/2014 | Stockwell et al. | |
| 8,956,144 B2 | 2/2015 | Grasegger et al. | |
| 2004/0045941 A1 * | 3/2004 | Herzog | B23K 26/02 219/121.6 |
| 2006/0219671 A1 * | 10/2006 | Merot | B33Y 40/00 219/121.6 |
| 2010/0151136 A1 * | 6/2010 | Davidson | B41J 2/16552 427/356 |
| 2013/0052291 A1 * | 2/2013 | Morikawa | B29C 64/176 425/135 |
| 2014/0065194 A1 | 3/2014 | Yoo et al. | |
| 2014/0191439 A1 | 7/2014 | Davis | |
| 2014/0265049 A1 * | 9/2014 | Burris | B29C 64/386 264/497 |
| 2015/0314389 A1 | 11/2015 | Yamada | |
| 2015/0367415 A1 * | 12/2015 | Buller | B22F 3/004 419/53 |
| 2017/0305140 A1 * | 10/2017 | Wust | B33Y 30/00 |
| 2019/0126346 A1 * | 5/2019 | Graichen | B33Y 30/00 |

FOREIGN PATENT DOCUMENTS

| | | |
|---|---|---|
| JP | 2015531321 | 11/2015 |
| JP | 2017512689 | 5/2017 |
| WO | WO2014020086 | 2/2014 |
| WO | WO2015108545 | 7/2015 |
| WO | WO 2015108551 | 7/2015 |
| WO | WO 2016030530 | 3/2016 |
| WO | WO2016050311 | 4/2016 |

OTHER PUBLICATIONS

Slusarczyk, Pawel, "Kielce 3D Printing Center Brings Large-Scale SLS 3D Printing to Europe", 3D Printing Industry, 2015, 6 pages.

* cited by examiner

ADDITIVE MANUFACTURING TRANSPORT DEVICES

BACKGROUND

Additive manufacturing systems enable the generation of three-dimensional objects on a layer-by-layer basis.

BRIEF DESCRIPTION OF THE DRAWINGS

Examples will now be described, by way of non-limiting example, with reference to the accompanying drawings, in which.

DETAILED DESCRIPTION

Figure 1:
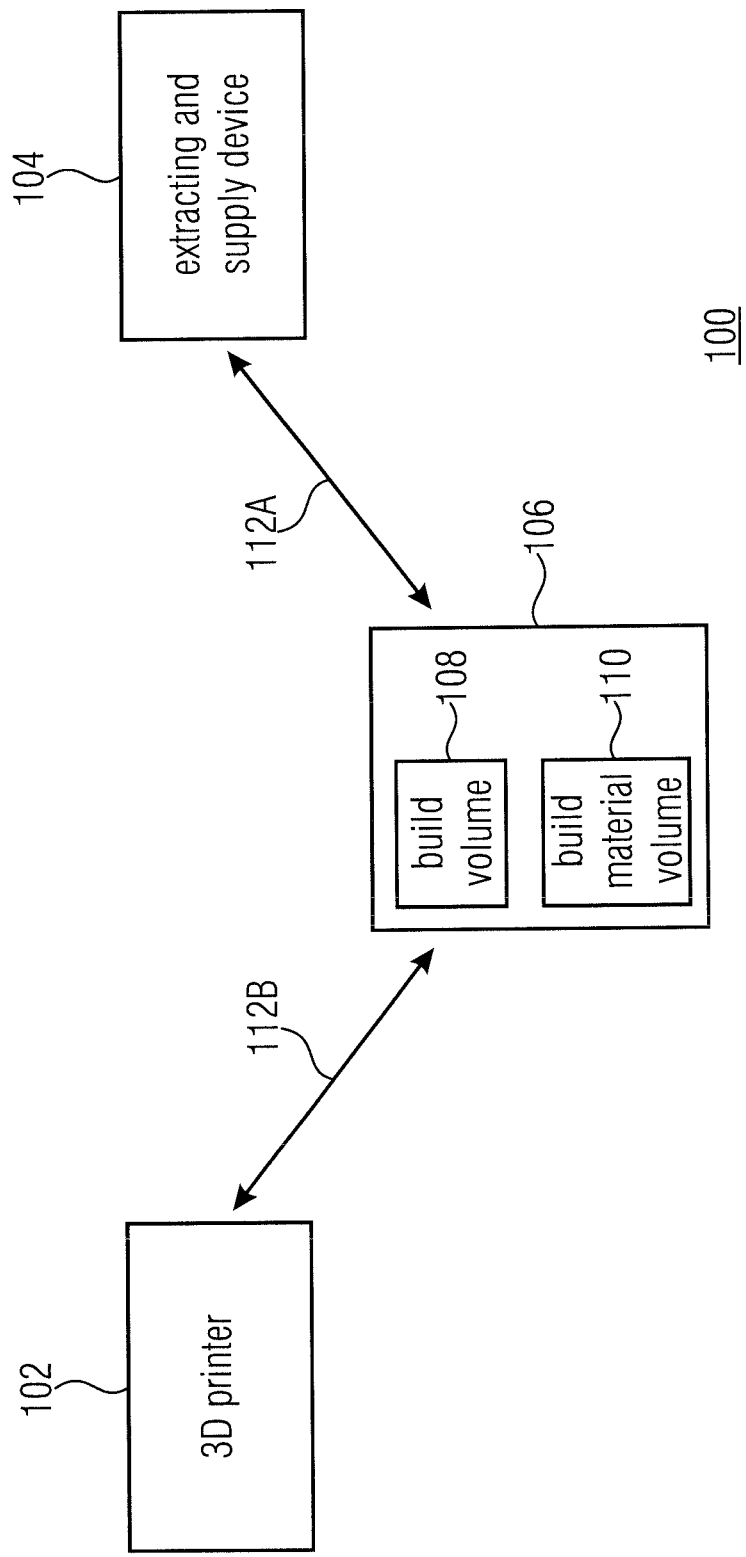
FIG. 1 is an illustration of an additive manufacturing system according to an example.

Three dimensional (3D) printing, also referred to as additive manufacturing, rapid prototyping or solid freeform fabrication, is a technology for manufacturing a vast variety of objects. Some additive manufacturing systems generate three-dimensional objects through the selective solidification of successive layers of a build material, such as a powdered build material. Some of such systems may solidify portions of a build material by selectively depositing an agent to a layer of build material. Some systems, for example, may use a liquid binder agent to chemically solidify build material where the liquid binder agent is applied.

Other systems, for example, may use liquid energy absorbing agents, or coalescing or fusing agents, that cause build material to solidify when suitable energy, such as infra-red energy, is applied to build material on which an energy absorbing or coalescing agent has been applied. The temporary application of energy may cause portions of the build material on which coalescing agent has been delivered, or has penetrated, to absorb energy. This in turn causes these portions of build material to heat up above the melting point of the build material and to coalesce or fuse. Upon cooling, the portions which have coalesced become solid and form part of the three-dimensional object being generated.

Other systems may use additional agents, such as coalescence modifier or fusion inhibiting agents, in conjunction with coalescing agents. A coalescence modifier agent is an agent that serves, for example, to modify the degree of coalescence of a portion of build material on which the coalescence modifier agent has been delivered or has penetrated.

The production of a three-dimensional object through the selective solidification of successive layers of build material may involve a set of defined operations. An initial process may, for example, be to form a layer of build material from which a layer of the three-dimensional object is to be generated. A subsequent process may be, for example, to selectively deposit an agent to selected portions of a formed layer of build material. In some examples, a further subsequent process may be to supply energy to the build material on which an agent has been deposited to solidify the build material in accordance with where the agent was deposited. Repeating these processes enables a three-dimensional object to be generated layer-by-layer, through selective solidification of portions of successive layers of build material.

An additive manufacturing system may have a somewhat fixed configuration which may or may not meet a particular productivity demand. Examples described herein, however, provide an additive manufacturing system that is a combination of a 3D printing device, a trolley, also referred to as transport device, and a post-processing unit, also referred to as an extracting and supply device, that allows for a configuration of the units to meet a user's demand for productivity and to enhance the capacity of each component.

Referring now to FIG. 1, there is shown a simplified illustration of an additive manufacturing system 100 according to an example. The additive manufacturing system 100 includes a 3D printer 102, an extracting and supply device 104, and a transport device 106. The transport device includes a build volume 108, also referred to as a volume to contain an object created by the additive manufacturing system 100, and a build material volume 110, also referred to as a volume to receive a build material As indicated by arrows 112A and 112B the transport device 106 may cooperate with the 3D printer 102 and the extracting and supply device 104. The 3D printer 102 may receive the transport device 106 and form an object. The 3D printer 102 includes the respective elements to process the material from which the object is to be formed, which is also referred to as the build material. The 3D printer receives the transport device 106 and obtains the build material from the build material volume 110. The 3D printer 102 uses the build material obtained from the build material volume 110 of the transport device 106 to form the object in the build volume 108 of the transport device 106.

In accordance with examples, since the build material is provided to the 3D printer 102 by the transport device 106, the 3D printer 102 may not include any built-in reservoirs for holding the build material. In accordance with other examples, the 3D printer 102 may include a build material reservoir and may selectively obtain the build material from the 3D printer internal reservoir or from the build material volume 110 of the transport device 106. The transport device 106 may also be received by the extracting and supply device 104, for example, once a build process has been completed by the 3D printer 102 the object built in the build volume 108 of the transport device 106 is transferred from the 3D printer 102 to the extracting and supply device 104 using the transport device 106. At the extracting and supply device 104, the completed object may be extracted from the build volume 108 of the transport device 106.

In accordance with examples, additional finishing processes may be applied to the extracted object. Further, at the extracting and supply device 104 the build material volume 110 of the transport device 106 may be refilled. Once the refill of the build material volume 110 is completed, the transport device 106 may be returned to the 3D printer 102 for forming another object. The additive manufacturing system combines the 3D printer 102, the transport device 106 and the extracting and supply device 104 in a distributed architecture.

In accordance with examples, the 3D printer may be provided in an environment, e.g. in a cleanroom, having a level of contamination or pollutants in the air which is less than a level of contamination or pollutants in an environment in which the extracting and supply device 104 is placed. The transport device 106 may enter the cleanroom in which the 3D printer is disposed through an air lock. This allows for the forming of the objects in a clean environment while the handling of the object after completion and the refilling of the build material may be performed outside the cleanroom. Operations at the extracting and supply device 104 include user interactions that happen in a less sensitive environment. The cleanroom may be accessed less frequently, e.g. when servicing the 3D printer 102.

In accordance with examples, the transport device 106 may be a self-propel, autonomous device that automatically moves between the 3D printer 102 and the extracting and supply device 104. In other examples, a conveying system may be provided between the 3D printer 102 and the extracting and supply device 104 to allow for the movement of the transport device therebetween. In other examples, the transport device 106 may be moved between the 3D printer 102 and the extracting and supply device 104 manually, for example by pushing the transport device 106 by a user.

The distributed or modular architecture of the additive manufacturing system in accordance with the described example allows a user to configure the manufacturing system so as to meet the demand for productivity and to also enhance the capacity of each component. The user may independently configure the respective units of the production system, e.g. the 3D printer 102, the transport device 106 and the extracting and supply device 104. The additive manufacturing system splits two distinct processes of the additive manufacturing process into separate components. The processes include the build job process and the preparation and post-processing process for the build. The modular additive manufacturing system reduces the integration risk as the management operations regarding the build material and the printing operations are separated and may be developed and optimized independently. In other words, modifications in the 3D printer 102 may be made independent from the extracting and supply device 104 and vice versa. The transport device 106 may be modified independently.

Figure 2A:
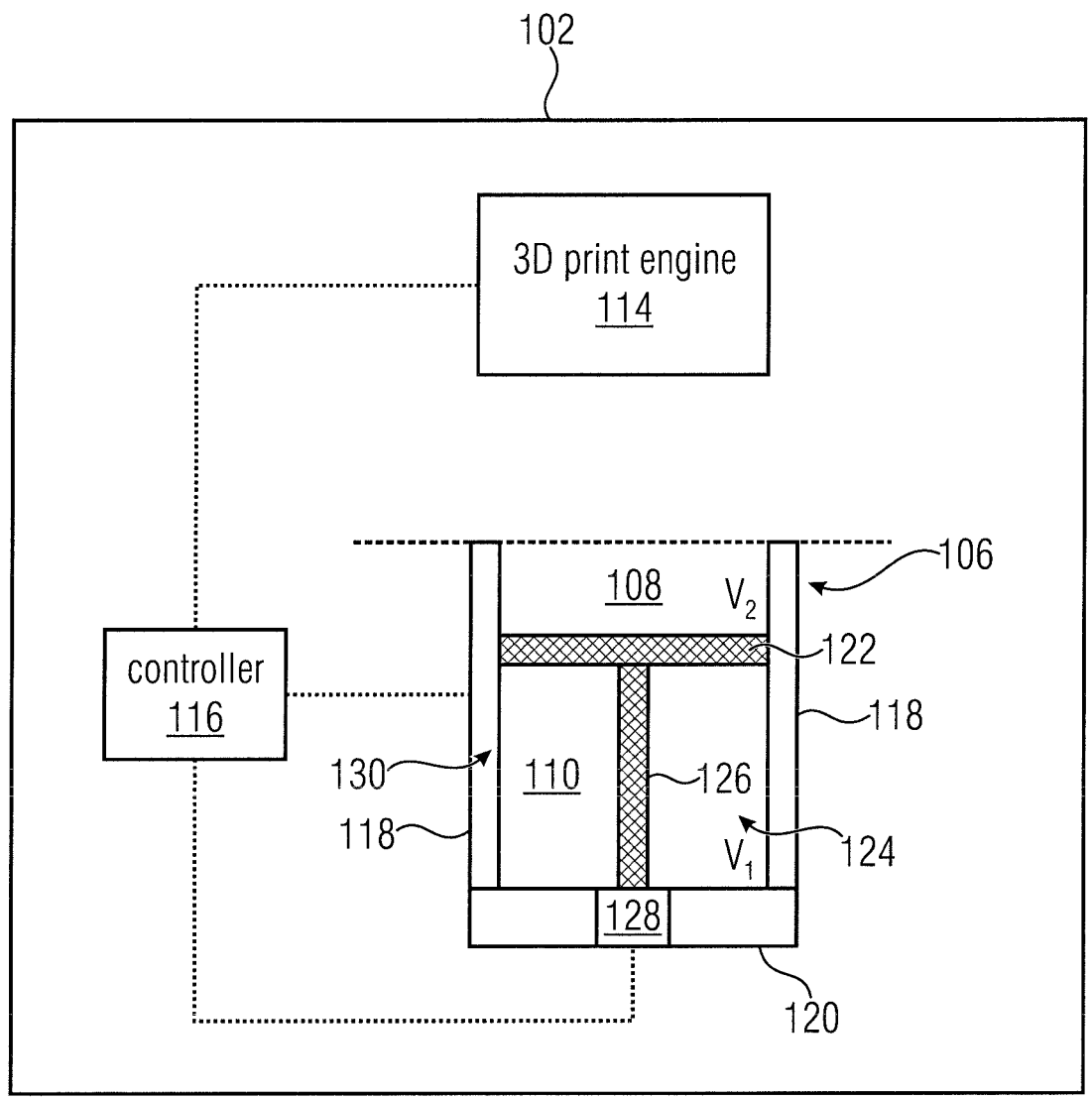
FIG. 2A is an illustration of a 3D printer and a transport device of an additive manufacturing system according to an example.

FIG. 2A is an illustration of a 3D printer 102 and a transport device 106 of an additive manufacturing system according to an example. The 3D printer 102 includes a 3D printing engine 114 to build an object, and a controller 116. In accordance with examples, the 3D printing engine 114 of the 3D printer may be a 3D printing engine using a coalescing agent technique or a 3D printing engine using a selective laser sintering (SLS) technique. The transport device 106 is disposed in the 3D printer 102.

In accordance with the depicted example, the transport device 106 has the form of a bucket enclosed by side walls 118 and a bottom wall 120. The top side is open, and this is where build material is applied to form an object on a build platform 122. The side walls 118 and bottom wall 120 define a common compartment 124, whose volume is divided by the build platform 122 into the build material volume 110 below the build platform 122 and the build volume 108 above the build platform 122 up to the level of the side walls 118. The upper boundary of the build volume 108 is indicated in FIG. 2A by a dashed line.

The build platform 122 is movably mounted and may be connected via a piston 126 to a drive unit 128 which moves the build platform 122 upwards and downwards in the common compartment 124. As the build platform 122 moves upwards and downwards in the common compartment 124, the volume $V1$ of the build material volume 110 and the volume $V2$ of the build volume 108 change accordingly. However, the sum of the volumes remains constant and equals the volume V of the common compartment 124, $V1+V2=V=\text{constant}$.

The common compartment 124, also referred to as storage compartment, stores the build material for the additive manufacturing process, such as a plastic, metal, ceramic, or glass powder. The build material is transported from the common compartment 124 to the build volume 108 using a transport unit 130, for example a screw drive integrated into the side walls 118.

The controller 116 may be provided to control the 3D printing engine 114 and to control the transport device 106 when disposed in the 3D printer 102. The controller 116 controls the drive unit 128 to move the piston 126 and the build platform 122, and the transport unit 130 to transport the build material from the build material volume 110 to the build volume 108.

The manufacturing system in accordance with the example of FIG. 2A combines the supply or build material volume 110, the build volume 108 and the transport unit 130 in a single unit, namely in the transport device 106, thereby optimizing the system volume/footprint and enhancing an efficiency of the material delivery due to the short path from the build material volume 110 to the build platform 122. In accordance with the example of FIG. 2A the build material volume 110 is located below the build volume 108. In accordance with other examples, the build material volume 110 and the build volume 108 may be located differently, e.g. the build material volume 110 and the build volume 108 may be located side by side.

Figure 2B:
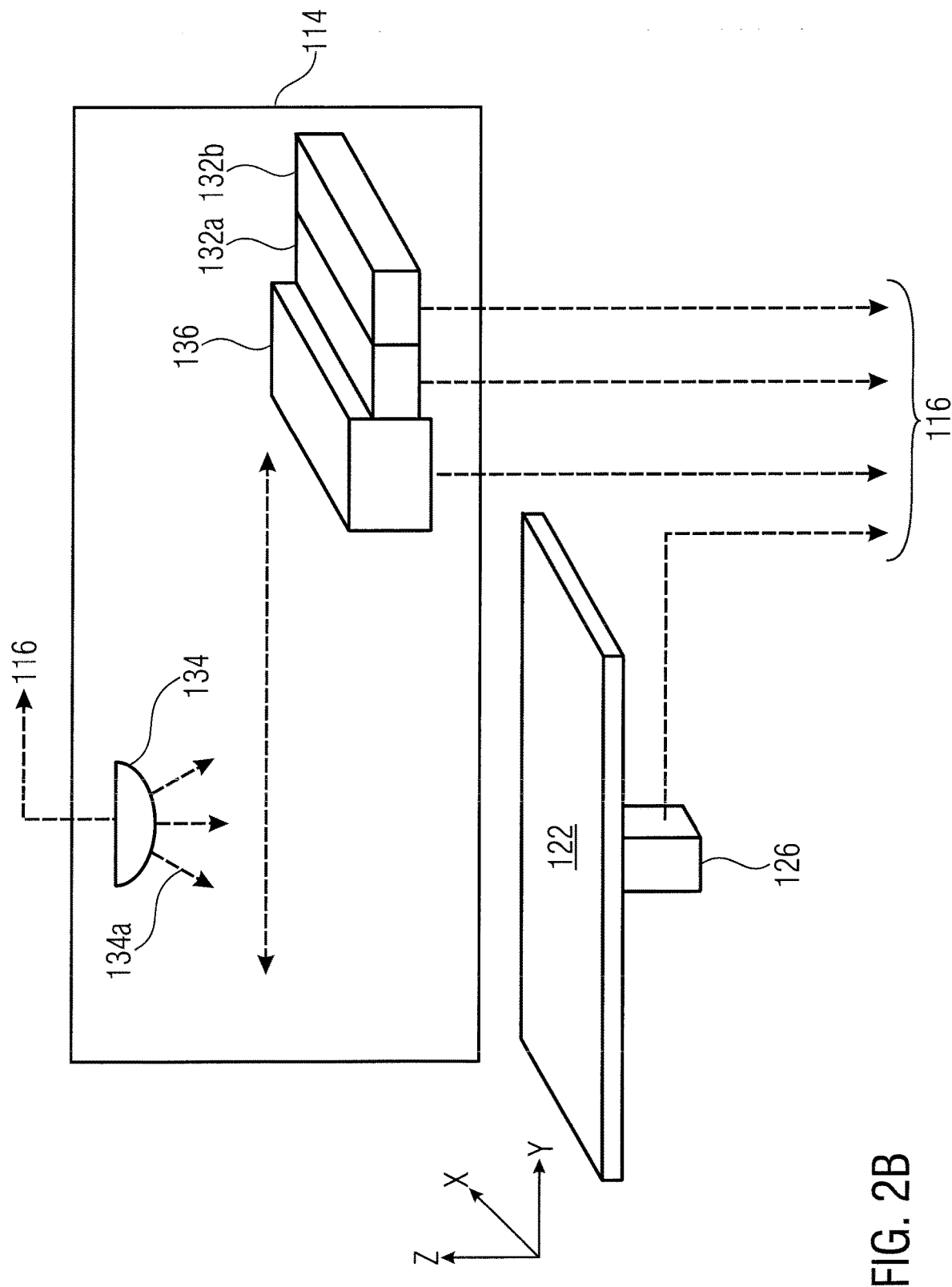
FIG. 2B is a simplified illustration of a 3D printing engine according to an example using a coalescing agent technique.

FIG. 2B is a simplified illustration of a 3D printing engine 114 according to an example using a coalescing agent technique. The build material may be a powder-based build material. A powder-based material may be a dry or wet powder-based material, a particulate material, or a granular material. In some examples, the build material may include a mixture of air and solid polymer particles, for example at a ratio of about 40% air and about 60% solid polymer particles. Other examples of suitable build materials may include a powdered metal material, a powdered composite material, a powder ceramic material, a powdered glass material, a powdered resin material, a powdered polymer material, and combinations thereof. In other examples the build material may be a paste, a liquid, or a gel.

The 3D printing engine 114 includes a coalescing or fusing agent distributor 132*a* to selectively deliver a coalescing or fusing agent to successive layers of build material provided on the build platform 122 and an energy source 134. A suitable coalescing agent may be an ink-type formulation comprising carbon black. Such an ink may additionally comprise an absorber that absorbs the radiant spectrum of energy emitted by the energy source 134. For example, the ink may additionally comprise an infra-red light absorber, a near infra-red light absorber, a visible light absorber or a UV light absorber. The agent distributor 132*a* may be a printhead, such as thermal printhead or piezo inkjet printhead. The printhead may have arrays of nozzles. In other examples, the agents may be delivered through spray nozzles rather than through printheads. In some examples the printhead may be a drop-on-demand printhead. In other examples the printhead may be a continuous drop printhead. The agent distributor 132a may extend fully across the build platform 122 in a so-called page-wide array configuration. In other examples, the agent distributor 132a may extend across a part of the build platform 122. The agent distributor 132a may be mounted on a moveable carriage to enable it to move bi-directionally across the build platform 122 along the illustrated y-axis. This enables selective delivery of coalescing agent across the entire build platform 122 in a single pass. In other examples the agent distributor 132a may be fixed, and the build platform 122 may move relative to the agent distributor 132a.

In some examples, there may be an additional coalescing agent distributor 132b. The coalescing agent distributors 132a, 132b may be located on the same carriage, either adjacent to each other or separated by a short distance. In other examples, two carriages each may contain the coalescing agent distributors 132a, 132b. In some examples, the additional coalescing agent distributor 132b may deliver a different coalescing agent than the coalescing agent distributor 132a.

The 3D print engine 114 further includes a build material distributor 136 to provide, e.g. deliver or deposit, successive layers of build material on the build platform 122. Suitable build material distributors 136 may include a wiper blade and a roller. In the example shown the build material distributor 136 moves along the y-axis of the build platform 122 to deposit a layer of build material. A layer of build material will be deposited on the build platform 122, and subsequent layers of build material will be deposited on a previously deposited layer of build material. In the example shown the build platform 122 is moveable in the z-axis such that as new layers of build material are deposited a predetermined gap is maintained between the surface of the most recently deposited layer of build material and a lower surface of the agent distributor 132a. In other examples, however, the build platform 122 may not be movable in the z-axis and the agent distributor 132a and the build material distributor 136 may be movable in the z-axis.

The energy source 134 applies energy 134a to the build material to cause a solidification of portions of the build material, for example to portions to which an agent, e.g., the coalescing agent, has been delivered or has penetrated. In some examples, the energy source 134 is an infra-red (IR) radiation source, a near infra-red radiation source, or a halogen radiation source. In some examples, the energy source 134 applies energy in a substantially uniform manner to the whole surface of a layer of build material, and a whole layer may have energy applied thereto simultaneously, which may increase the speed at which a three-dimensional object may be generated. In other examples, the energy source 134 applies energy in a substantially uniform manner to a portion of the whole surface of a layer of build material. For example, the energy source 134 may apply energy to a strip of the whole surface of a layer of build material. In these examples the energy source 134 may be moved or scanned across the layer of build material such that a substantially equal amount of energy is ultimately applied across the whole surface of a layer of build material. In some examples, the energy source 134 may be mounted on the moveable carriage. In other examples, the energy source 134 may apply a variable amount of energy as it is moved across the layer of build material, for example in accordance with agent delivery control data. For example, the controller 116 may control the energy source 134 to apply energy to portions of build material on which coalescing agent has been applied.

Figure 2C:
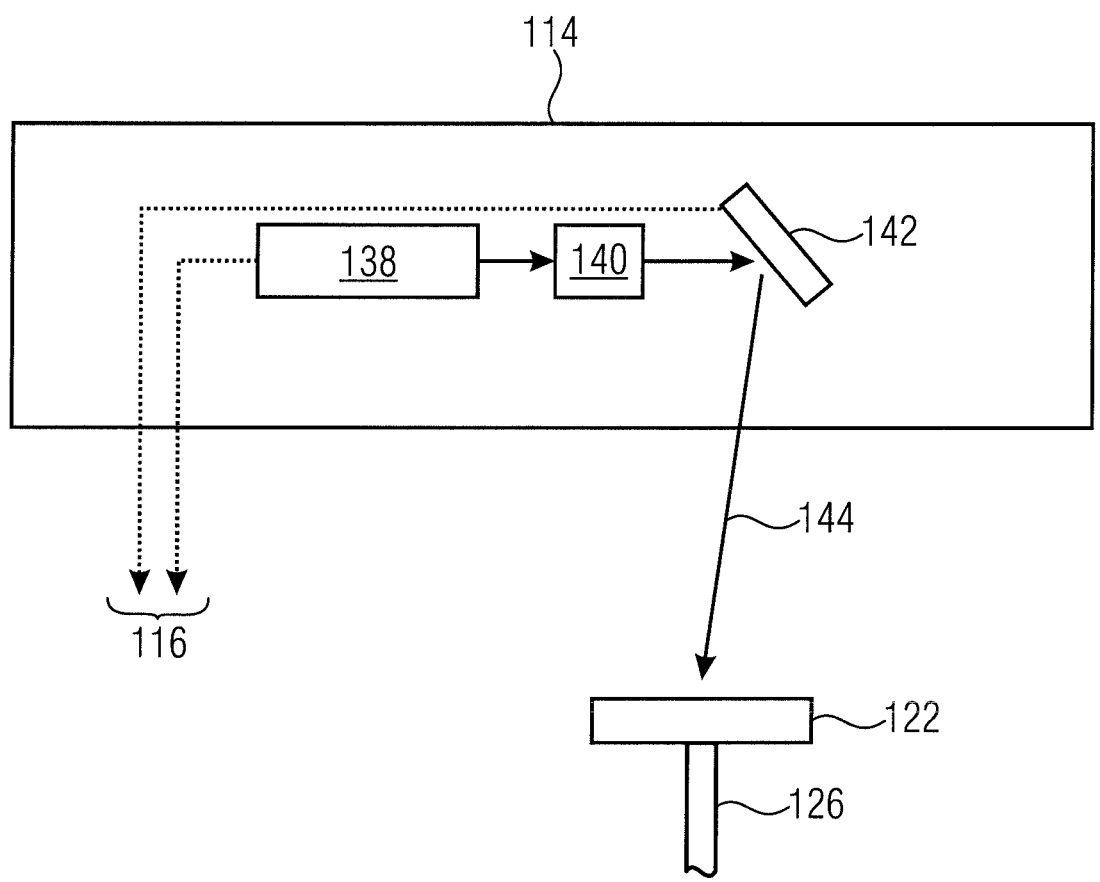
FIG. 2C is a schematic view of 3D printing engine 114 according to an example using a selective laser sintering (SLS) technique.

FIG. 2C is a schematic view of 3D printing engine 114 according to an example using the SLS technique. The 3D printing engine 114 includes an optical system having a laser 138, e.g., an ultraviolet or carbon dioxide laser, an optical lens 140 and an x-y scanning mirror 142. The x-y scanning mirror 142 directs a laser beam 140 emitted from the laser 138 and focused by the lens 140 onto selected portions of the build or powder material on the surface of a powder bed accumulated on the build platform 122. The energy input from the laser beam 144 fuses the powder material, thereby binding the material together to create a solid structure. After each cross-section is scanned, the build platform 122 is lowered by one layer thickness, a new layer of material is formed on top, and the process is repeated until the object is completed. The controller 116 may be provided to control the delivery of build material, the laser 138 and the x-y scanning mirror 142 for directing the laser beam 144 to selected portions of the build platform 122.

Figure 3:
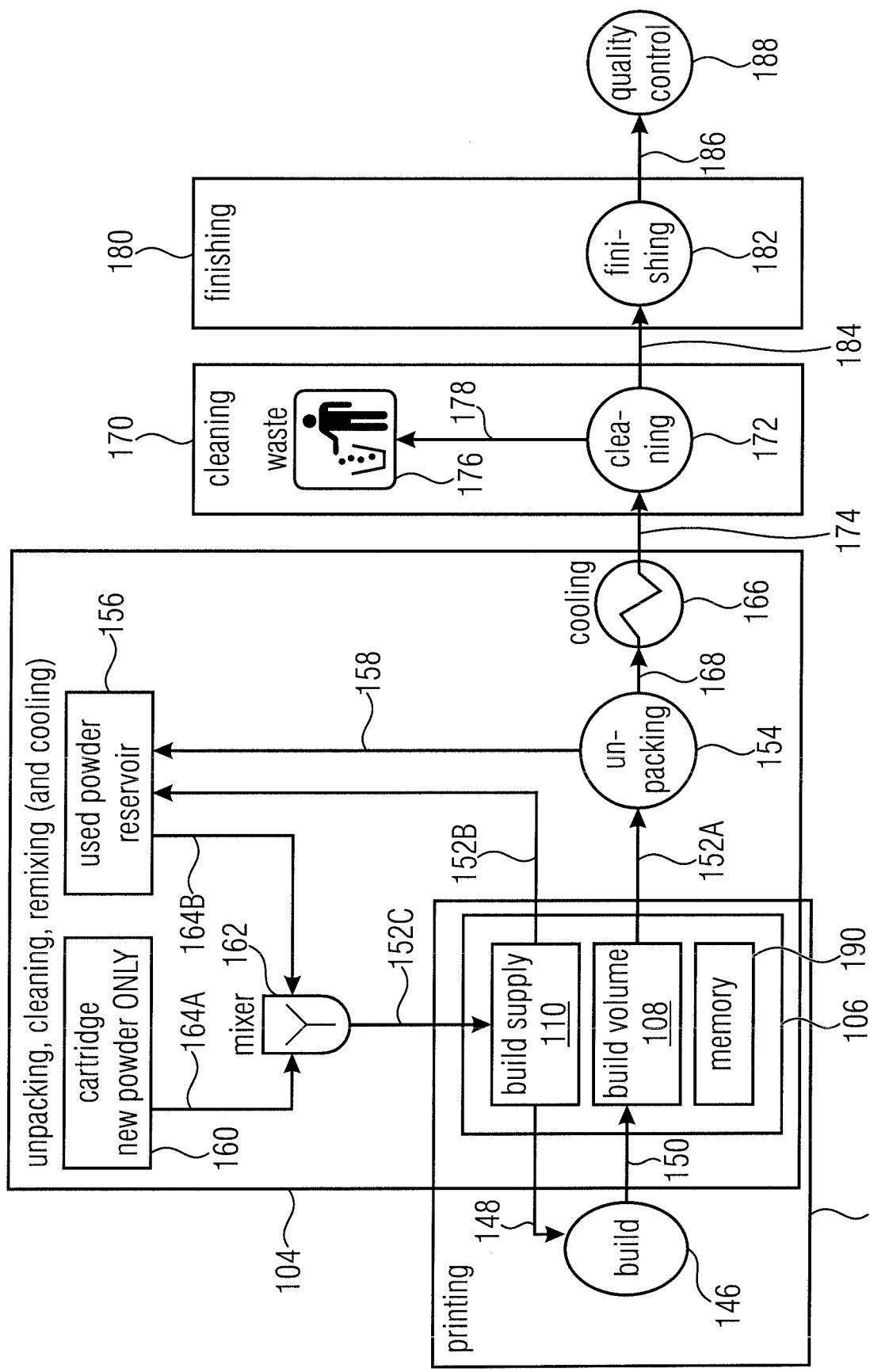
FIG. 3 is a block diagram representing an additive manufacturing system according to an example.

FIG. 3 is a block diagram representing an additive manufacturing system according to an example. The additive manufacturing system is schematically shown and includes a 3D printer, e.g., the 3D printer 102 shown in FIG. 2A. In the example of FIG. 3, the transport device is referred to as a trolley 106, and the extracting and supply device is referred to as a unpacking, cleaning and remixing unit or UCR unit 104. The build material may also be referred to as a powder or powder material. FIG. 3 also represents the respective processes of the 3D printing workflow. The different processes are grouped into different functional components, namely the 3D printer 102 providing for the printing operation, the UCR unit 104 providing for the unpacking and cleaning of the built object and for the powder management, and the trolley 106 providing for the powder supply and transport management. The common use of the trolley 106 in the 3D printer 102 and the UCR unit 104 is schematically represented by showing the trolley 106 to be part of both the 3D printer 102 and the UCR unit 104. In a non-functional view, the 3D printer 102 and the UCR unit 104 are separated from each other, as shown in FIG. 1, and the trolley 106, at a given time, is disposed in one of the 3D printer 102 and the UCR unit 104 for having the object formed or for having an object removed and a build material volume filled or refilled.

The 3D printer 102 performs a build process 146 using, e.g., a 3D print engine 114 described in accordance with the examples of FIG. 2B or FIG. 2C. The build material is supplied to the build process 146 from the build material volume 110 of the trolley 106 as is schematically represented by arrow 148. The build process 146 causes forming of the object from the build material and, as is schematically represented by arrow 150, the build process 146 forms the object in the build volume 108 of the trolley 106, for example in a way as described above with reference to FIG. 2.

When the trolley 106 is located in the UCR unit 104, the trolley 106 interacts with the UCR unit 104, as is schematically shown by arrows 152A to 152C. The UCR unit 104 unpacks an object that has been built by the 3D printer in the build volume 108 of the trolley 106, as is schematically represented by the unpacking process 154. The unpacking process 154 may remove the object from the build volume 108 of the trolley 106 together with unused build material still present in the build volume 108, for example the amount of powder in the respective layers which has not been solidified by the 3D manufacturing process. The unpacking process 154 may separate or remove the unused powder from the build volume 108, and feed the unused powder into an unused powder reservoir 156 of the UCR unit 104, as is schematically represented by arrow 158.

The UCR unit 104 may interact with the trolley 106 to remove unused build material from the build material volume 110 of the trolley, and feed the unused build material from the build material volume 110 to the unused powder reservoir 156, as is indicated by arrow 152B.

The UCR unit 104 may include a new powder reservoir 160, for example in the form of a replaceable cartridge. A mixer 162 may be provided to receive from the new powder reservoir 160 and from the unused powder reservoir 156 build material, as is indicated by arrows 164A and 164B. The mixer 162 mixes the build material from the used powder reservoir 156 and the material from the new powder reservoir 160 in a desired ratio that may be set by a user of the system. The UCR unit 104 refills the build material volume 110, as is schematically represented by the arrow 152C, so as to ready the trolley 106 for a new 3D printing process.

The UCR unit 104 may provide for a cooling process 166 receiving from the unpacking process 154 the object or part, as is schematically represented by arrow 168. The cooling process 166 may implement a desired annealing/cooling process for the object received from the 3D printer prior to forwarding it to further handling units. In accordance with examples, the further handling of the unpacked and cooled/annealed object may include a cleaning process and a finishing process, as is schematically represented in FIG. 3. The manufacturing system may include a cleaning module 170 implementing a cleaning process 172. The object formed by the 3D printer, also referred to as 3D printed object, may have adhered thereto build material or contaminants after unpacking and cooling. When receiving the 3D printed object, as is indicated at arrow 174, the cleaning module performs a cleaning process of the part to remove the undesired contaminants or the remaining build material which is supplied to a waste reservoir 176 as indicated by arrow 178. The manufacturing system may further include a finishing module 180 implementing a finishing process 182. The finishing module 180 receives the cleaned 3D printed object, as is represented by arrow 184, and the finishing process 182 applies a selected finishing operation on the part, for example to remove ridges or edges using an appropriate process. The finishing module 180 outputs the finished part, as is indicated at arrow 186. The finished part may be supplied to a quality control process 188 judging whether the quality of the finished part is within preset quality parameters or not. In accordance with examples, the UCR unit 104 may implement a build material recycling process which may include a sieving and recycling of the build material retrieved from the build material volume of the trolley.

The UCR unit 104 may be the starting and end point of the work flow for a build job. The build job may start with filling up the trolley 106 and preparing it for the build operation. The 3D printer 102 may have a structure as described with reference to FIG. 2 and is responsible for the actual build process. The trolley 106 includes the build volume 108 and the build material volume 110, also referred to as powder supply, so as to provide for the print zone the transfer between the 3D printer 102 and the UCR unit 104. The work flow ends at the UCR unit 104 with the unpacking, annealing and cooling of the 3D printed part.

In accordance with examples the trolley 106 may include a memory 190 so as to allow for the exchange of information between the 3D printer 102 and the UCR unit 104 as the trolley 106 moves between the 3D printer 102 and the UCR unit 104. In accordance with examples, information to be forwarded from the UCR unit 104 to the 3D printer 102 may include:

the properties of the build material filled into the build material volume 110 of the trolley 106,
the mixing ratio of new powder and used powder as provided by the mixer 162 of the UCR unit 104,
the fill level of the powder in the build material volume 110,
the position of the mechanical components within the trolley 106 after completing the interaction with the UCR unit 104, for example when considering a trolley having a structure as shown in the example of FIG. 2, information about the vertical position of the build platform 122 may be included in the memory.

Information that is to be provided from the 3D printer 102 to the UCR unit 104 may include the geometrical properties of the object/part build. This may be useful for controlling the unpacking process 154 and the cooling process 166 in the UCR unit. The unpacking process 154 may obtain knowledge how to access the build volume and the build object, and the cooling process 166 may determine the cooling time or cooling rate,
the volume V2 of the build volume, in case of a trolley as described in the example of FIG. 2,
the unused powder remaining in the build supply volume,
the time of the build,
the print mode parameters, which may be used by the cooling process 166 in the UCR unit 104 to control annealing and/or cooling of the 3D printed object.

Figure 4:
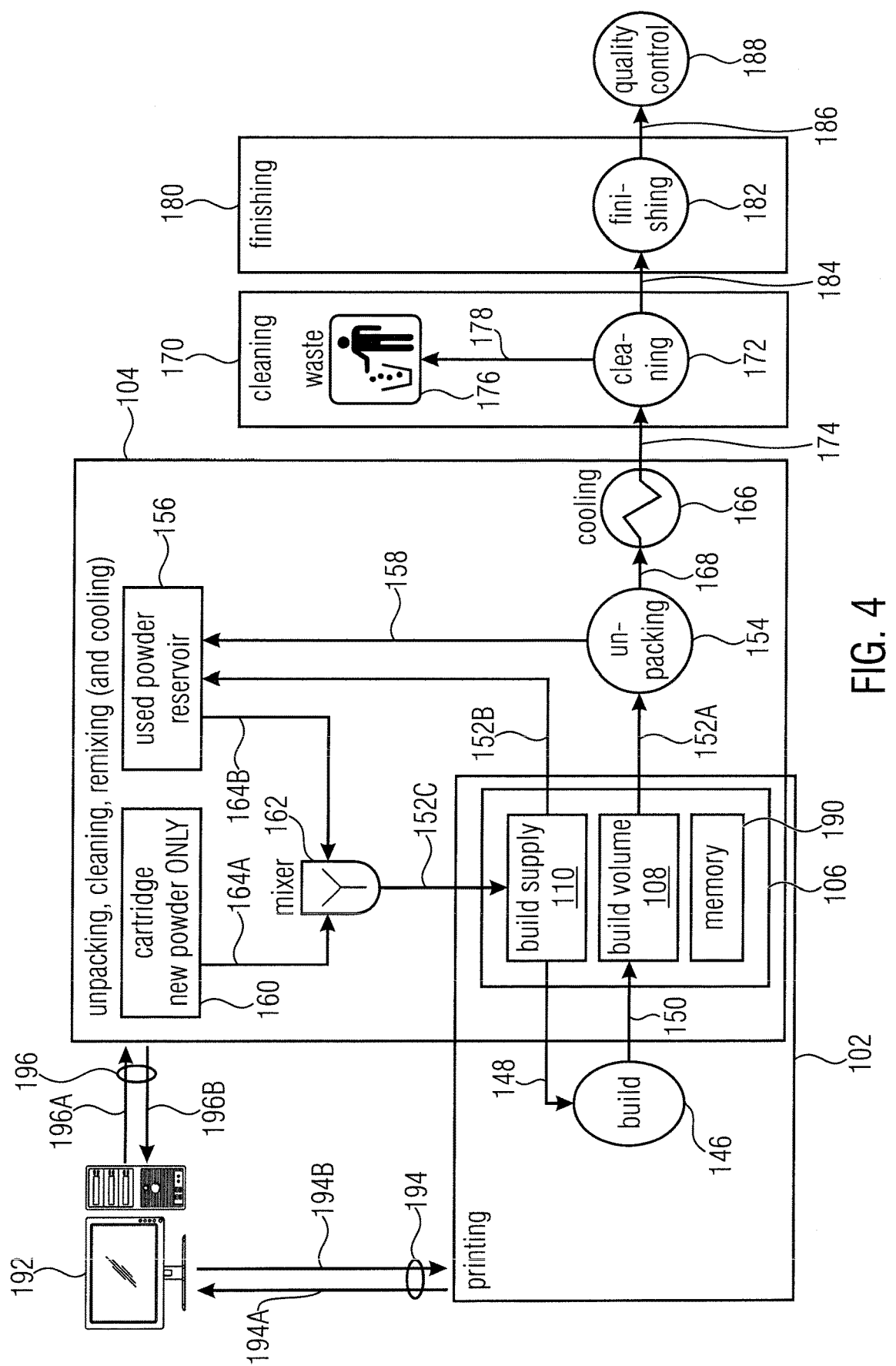
FIG. 4 is a block diagram representing an additive manufacturing system according to an example including a database.

In accordance with other examples, the above referenced information may be exchanged via a database to which the 3D printer 102 and the UCR 104 are connected. FIG. 4 shows a block diagram representing an additive manufacturing system including a database 192 according to an example. In FIG. 4 those elements which have already been described with reference to FIG. 3 have associated the same reference numbers without describing the elements again. The 3D printer 102 is connected to the database 192 using a first data communication link 194 allowing for a bidirectional communication between the 3D printer 102 and the database 192, as is represented by arrows 194A and 194B. The UCR unit 104 is connected to the database 192 using a second data communication link 196 providing for a bidirectional communication between the UCR unit 104 and database 192, as is represented by arrows 196A and 196B. The information mentioned above may be stored in the database 192 for each print process or print job for generating a 3D printed object. Each of the print processes or print jobs may be associated with a batch identification or batch ID and data is stored and accessed in the database 192 by the 3D printer 102 and the UCR unit 104 using the batch ID.

For example, when a new build job is generated, the UCR unit 104 may create a new batch ID and provide the information for the 3D printer 102 together with a new batch ID to the database 192 where it is stored so that it may be accessed using the batch ID. The batch ID is stored in the memory 190 of the trolley 106. Once the trolley 106 has been supplied with the material for the print job, it is transferred to the 3D printer 102 and, at the 3D printer 102, the memory 190 is read out to obtain the batch ID. The 3D printer 102 accesses the database 192 via the first data communication link 194 using the batch ID to obtain the geometrical data and further information for the build process 146 as is indicated by arrow 194A. During the 3D printing process or once it is completed, the 3D printer 102 may also forward information via the communication link 196 to the database 192, for example information about the properties of the build part, and a status of the material remaining in the build material volume 110. Also a log of the build process may be uploaded to the database 192, as is indicated by arrow 194B.

After the build process is completed, the trolley 106 is returned to the UCR unit 104 which may read out the memory 190 to obtain the batch ID, and the UCR unit 104 may access the database 192 using the batch ID to obtain the data provided by the 3D printer regarding the just finished build job, as indicated by arrow 196A. In other examples, the 3D printer 102, once the build job is completed, may signal this to the database 192 which may then forward the respective information together with the batch ID to the UCR unit 104. The information may be stored in the UCR unit 104 and once the trolley 106 reached the UCR unit 104, on the basis of the batch ID stored in the memory 190, the corresponding information already received from the database 192 may be accessed at the UCR unit 104 for controlling the unpacking and further finishing processes.

In accordance with the example of FIG. 4, the database 192 may be remote from the 3D printer 102 and may be remote from the UCR unit 104. The 3D printer 102 and the UCR unit 104 may be connected to the remote location by appropriate communication links, such as wired communications or wireless communications. For example, the database 192 may be a remote server or a cloud service accessed via the internet protocol. In this case, the trolley 106 stores the unique batch identifier that points to the appropriate entry in the database 192. In accordance with other examples, the database 192 may be part of the 3D printer 102 or may be part of the UCR unit 104, and the UCR unit 104 or the 3D printer 102 may be connected by a data communication link to the database.

The UCR unit 104 may be the starting and end point of the work flow for a build job. The build job may start with filling up the trolley 106 and preparing it for the build operation. The 3D printer 102 may have a structure as described with reference to FIG. 2 and is responsible for the actual build process. The trolley 106 includes the build volume 108 and the build material volume 110, also referred to as powder supply, so as to provide for the print zone the transfer between the 3D printer 102 and the UCR unit 104. The work flow ends at the UCR unit 104 with the unpacking, annealing and cooling of the 3D printed part.

Figure 5:
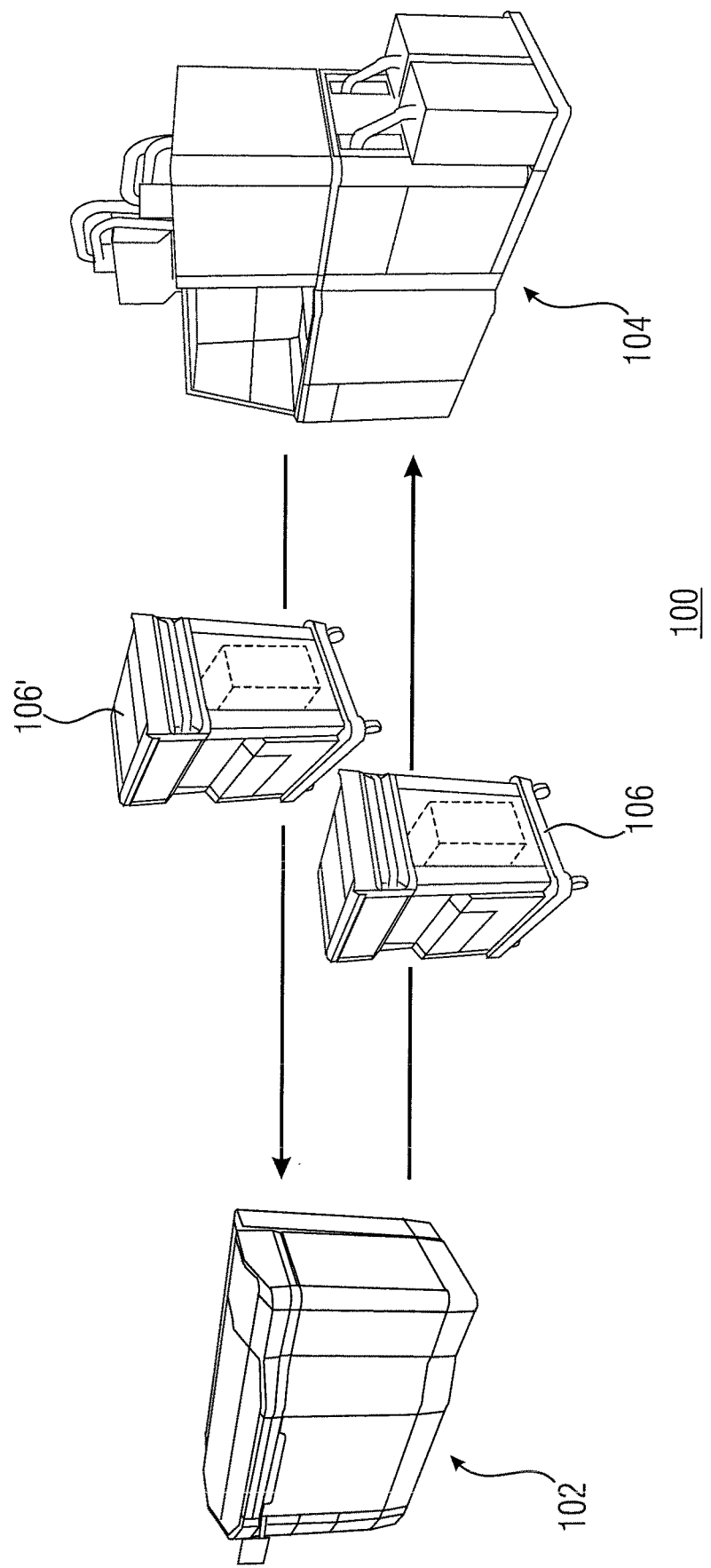
FIG. 5 is an illustration of an additive manufacturing system according to an example including two transport devices.

FIG. 5 is an illustration of an additive manufacturing system according to an example including two transport devices. The additive manufacturing system 100 includes the 3D printer 102 and the UCR unit 104, as well as a first trolley 106 and a second trolley 106'. The trolleys 106, 106' may be substantially identical in structure and the system may have more than two trolleys. The additive manufacturing system including the plurality of trolleys allows for operating the 3D printer 102 and the UCR unit 104 simultaneously so that a quasi-continuous operation may be achieved. The simultaneous operation may also enhance the productivity as the 3D printer 102 and the UCR unit 104.

The examples described above relate to an additive manufacturing system which combines the 3D printer, the trolley and the UCR unit in a modular way. The modularity may be such that the build material management and build material containment are restricted to the trolley and to the UCR unit. The 3D printer may not have a powder reservoir. All information related to the powder and the powder itself may be provided to the 3D printer via the trolley. This simplifies the design of the 3D printer and enables the support of different powder formulations just by using different trolleys or modifying the trolley design which may be the least expensive component of the system. The modularity may further enhance the system configurability for a user who may adapt the system to a particular production.

The additive manufacturing system may enhance the powder containment and powder transport efficiency as the supply volume, build volume and build material delivery are contained the transport trolley. This may enhance the system volume/footprint and the efficiency of the material delivery due to the short delivery path from the reservoir to the 3D printer.

The additive manufacturing system may enhance the productivity. For example in an example in which more than one trolley is available, the build operation and the post-processing and powder management operation may be run in parallel. In case a single trolley is available, maintenance actions may be performed on the idle unit while the other unit operates.

The additive manufacturing system may reduce the integration risk as splitting the 3D printing operation and the finishing operation into two independent, self-contained sub-systems reduces allows modifications in the respective units independent from each other. Also the development cycles may be accelerated.

Figure 6:
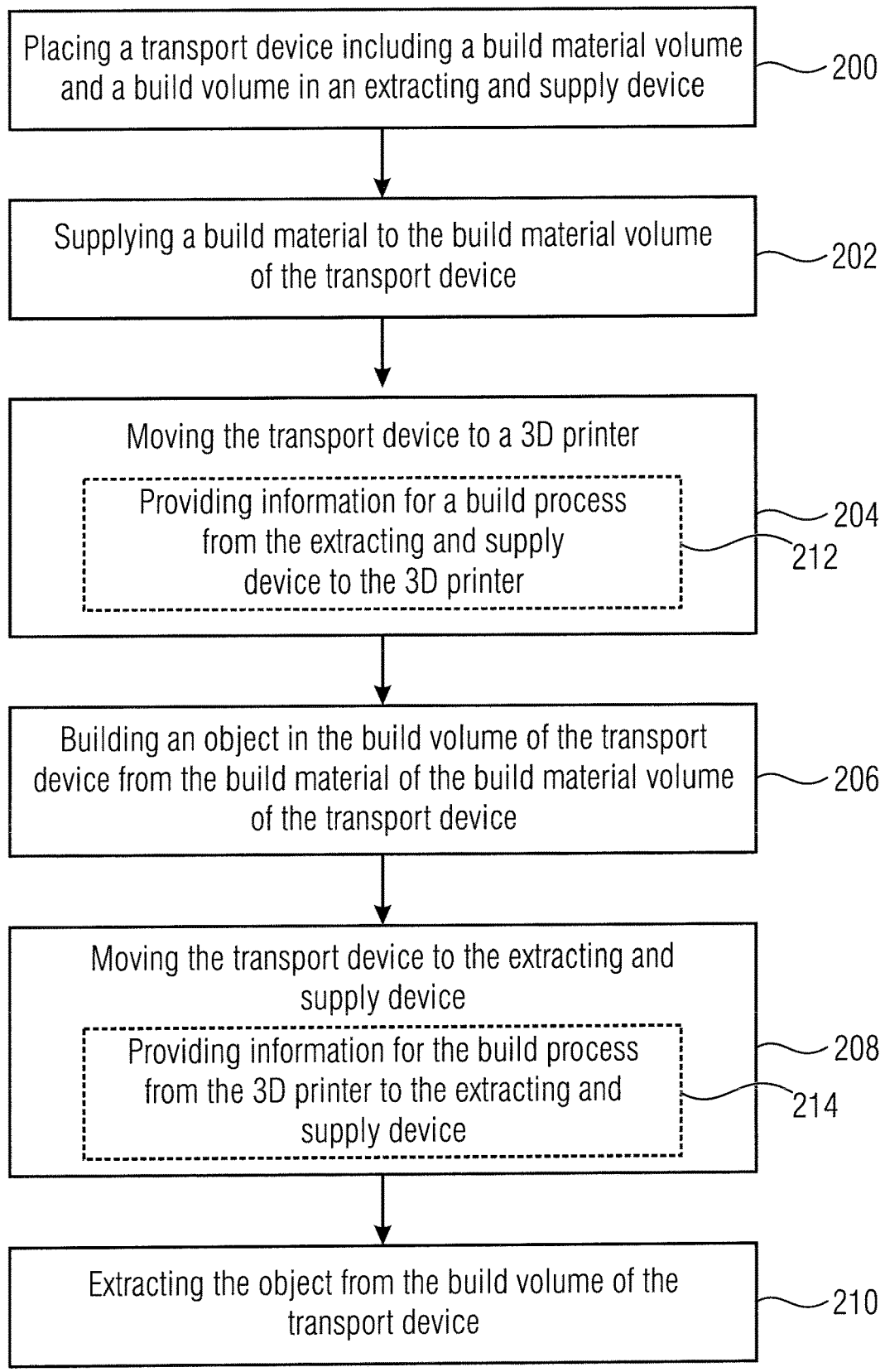
FIG. 6 is a flow diagram outlining a method of operating an additive manufacturing system according to an example.

FIG. 6 is a flow diagram outlining a method of operating an additive manufacturing system according to an example. The transport device 106 which includes the build material volume 110 and the build volume 108 are placed in the extracting and supply device 104 at 200. At 202, in the extracting and supply device, a build material is supplied to the build material volume 110 of the transport device 106. Once the supply of build material has been completed, at 204, the transport device 106 is moved to the 3D printer 102. At 206, in the 3D printer 102, an object is built in the build volume of the transport device 106 from the build material of the build material volume 110 of the transport device. Once the build is completed, at 208, the transport device is moved back to the extracting and supply device 104. In the extracting and supply device 104, at 210, the 3D printed object is extracted from the build volume 108 of the transport device 106.

In accordance with further examples, when moving the transport device between the 3D printer 102 and the extracting and supply device 104, at 212 information for the build process may be provided from the extracting and supply device 104 to the 3D printer 102, as is indicated, and at 214 information for the build process may be provided from the 3D printer 102 to the extracting and supply device.

Figure 7:
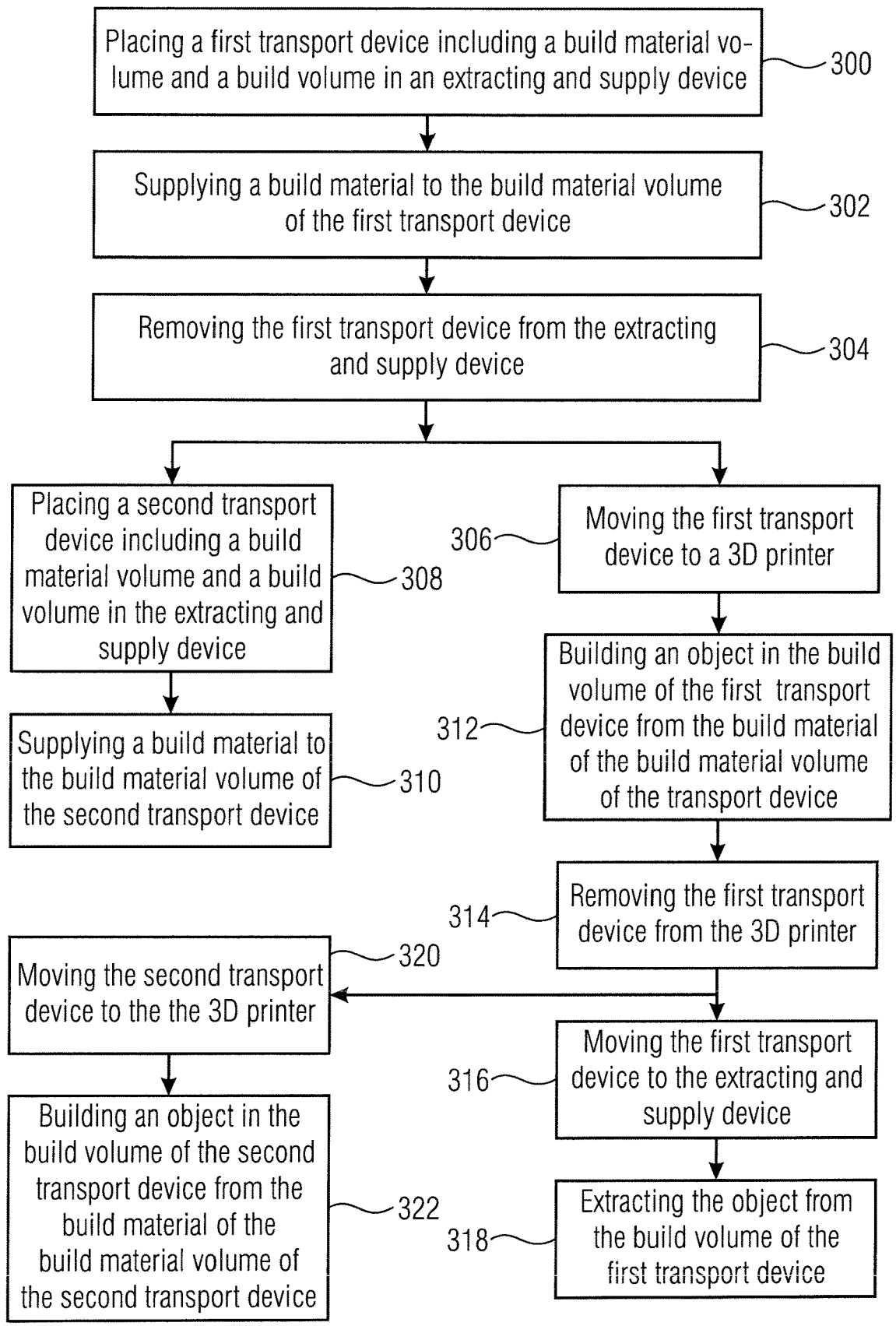
FIG. 7 is a flow diagram outlining a method of operating an additive manufacturing system according to an example including two transport devices.

FIG. 7 is a flow diagram outlining a method of operating an additive manufacturing system according to an example including two transport devices. At 300 a first transport device including the build material volume and the build volume is placed in the extracting and supply device. At 302 the build material is supplied to the build material volume of the first transport device, and at 304 the first transport device is removed from the extracting and supply device. Following the removal of the first transport device, at 306, the first transport device is moved to a 3D printer, and at 308 a second transport device including a build material volume and a build volume is placed in the extracting and supply device. At 310 the build material is supplied to the build material volume of the second transport device. At 312, following the movement of the first transport device to the 3D printer, in the 3D printer an object is built in the build volume of the first transport device from the build material of the build material volume of the transport device. Once the build is completed, at 314, the first transport device is removed from the 3D printer and at 316 the first transport device is moved to the extracting and supply device so that at 318 the 3D printed object is extracted from the build volume of the first transport device. Once the first transport device has been removed from the 3D printer, at 320 the second transport device is moved into the 3D printer and at 322 an object is built in the build volume of the second transport device from the build material of the build material volume of the second transport device.

In accordance with examples the process of FIG. 7 is repeated so as to provide a quasi-continuous operation of all components of the manufacturing system. For example following 318, the process may go to 302 again where the first transport device is re-filled with the build material, and following 322, once the extracting and supply device is no longer occupied by the first transport device, the second transport device may be moved to the extracting and supply device where the 3D printed object is extracted and the supply is refilled so that the second transport device is ready for the next build job.

Although some aspects of the techniques described herein have been described in the context of an apparatus, these aspects may also represent a description of corresponding method blocks. Analogously, aspects described in the context of a method also represent a description of corresponding blocks or items or features of a corresponding apparatus.

All of the features disclosed in this specification, including any accompanying claims, abstract and drawings, and/or all of the method bocks or processes so disclosed may be combined in any combination, except combinations where at least some of the features are mutually exclusive. Each feature disclosed in this specification, including any accompanying claims, abstract and drawings, may be replaced by alternative features serving the same, equivalent or similar purpose, unless expressly stated otherwise. Thus, unless expressly stated otherwise, each feature disclosed is one example of a generic series of equivalent or similar features.

The invention claimed is:

1. A transport device for an additive manufacturing system, comprising:
   a build platform;
   a first volume configured to receive a build material; and
   a second volume separate from the first volume, the second volume located above the first volume, bounded in part by the build platform and configured to contain an object built on the build platform;
   the transport device configured to be received by a 3D printer of the additive manufacturing system for building the object on the build platform in the second volume; and
   the transport device configured to be received by an extracting and supply device for extracting the object from the second volume and supplying the build material to the first volume.

2. An additive manufacturing system, comprising:
   a transport device of claim 1;
   a 3D printer configured to receive the transport device and to build the object in the second volume of the transport device from a build material in the first volume of the transport device; and
   an extracting and supply device configured to receive the transport device, to extract the object from the second volume of the transport device, and to supply the build material to the first volume of the transport device.

3. The additive manufacturing system of claim 2, wherein the transport device is configured to exchange information for a build process between the 3D printer and the extracting and supply device.

4. The additive manufacturing system of claim 3, comprising a build material in the first volume and wherein the transport device includes a memory storing a batch ID associated with the information for the build process.

5. The additive manufacturing system of claim 3, comprising a database storing information for the build process, and wherein:
   the transport device includes a memory storing a batch ID associated with the information for the build process,
   the 3D printer is configured to obtain the batch ID from the transport device and to access the database using the batch ID, and
   the extracting and supply device is configured to obtain the batch ID from the transport device and to access the database using the batch ID.

6. The additive manufacturing system of claim 5, comprising a first data communication link between the database and the 3D printer and a second data communication link between the database and the extracting and supply device, and wherein:
   the 3D printer is configured to send the information for the build process to the database and to retrieve the information for the build process from the database via the first data communication link, and
   wherein the extracting and supply device is configured to send the information for the build process to the database and to retrieve the information for the build process from the database via the second data communication link.

7. The additive manufacturing system of claim 5, wherein the database is located remote from one or both of the 3D printer and the extracting and supply device.

8. The additive manufacturing system of claim 3,
   wherein the information to be provided from the extracting and supply device to the 3D printer comprises:
   properties of the build material supplied to the first volume of the transport device,
   a mixing rate of the build material in the first volume of the transport device, the mixing rate indicating a ratio of fresh build material and used build material,
   a fill level of the build material in the first volume of the transport device, or
   a position of a mechanical component in the transport device when leaving the extracting and supply device, or
   wherein the information to be provided from the 3D printer to the extracting and supply device comprises:
   a batch ID,
   geometrical properties of the built object,
   remaining unused build material,
   time of build, or
   print mode parameters including parameters related to a post-processing of the built object in the extracting and supply device.

9. The additive manufacturing system of claim 2, wherein the 3D printer and the extracting and supply device are disposed spaced apart from each other, and
   the transport device is movable between the 3D printer and the extracting and supply device.

10. The additive manufacturing system of claim 9, wherein
the 3D printer is disposed at a first location, the first location comprising an environment having a first level of contamination,
the extracting and supply device is disposed at a second location, the second location comprising an environment having a second level of contamination, and
the first level of contamination is lower than the second level of contamination.

11. The additive manufacturing system of claim 2, wherein the extracting and supply device is to perform
an operation to remove unused build material from the first volume of the transport device,
an operation to mix the unused build material from the first volume of the transport device with a fresh build material,
an operation to supply the mixed build material to the first volume of the transport device,
an operation to anneal the object in the second volume of the transport device,
an operation to unpack the annealed object from the second volume of the transport device, or
an operation to regain unused build material from the second volume of the transport device.

12. The transport device of claim 1, comprising:
a bottom;
sidewalls extending up from the bottom;
the build platform positioned within the sidewalls; and
the second volume bounded at least in part by the build platform and the sidewalls.

13. The transport device of claim 12, wherein the bottom and the sidewalls define a compartment divided by the build platform into the first volume below the build platform and the second volume above the build platform.

14. The transport device of claim 13, wherein:
the build platform comprises a movable build platform;
downward movement of the build platform expands the first volume and shrinks the second volume; and
upward movement of the build platform shrinks the first volume and expands the second volume.

15. The transport device of claim 13, wherein a sum of the first volume and the second volume remains constant throughout a full range of motion of the build platform.

16. A method, comprising:
placing a transport device in an extracting and supply device;
supplying a build material to a first volume of the transport device; then
moving the transport device with the build material in the first volume to a 3D printer;
the 3D printer building an object in a second volume of the transport device above and separate from the first volume using build material in the first volume of the transport device; then
moving the transport device to the extracting and supply device; and
extracting the object from the second volume of the transport device.

17. The method of claim 16, wherein
moving the transport device to the 3D printer comprises providing information for a build process from the extracting and supply device to the 3D printer, and
moving the transport device to the extracting and supply device comprises providing information for the build process from the 3D printer to the extracting and supply device.

18. A transport device for an additive manufacturing system, comprising:
a build platform;
a first volume bounded n part by the build platform and configured to receive a build material; and
a second volume separate from the first volume, the second volume bounded in part by the build platform and configured to contain an object built on the build platform;
the transport device configured to be received by a 3D printer of the additive manufacturing system for building the object on the build platform in the second volume; and
the transport device configured to be received by an extracting and supply device for extracting the object from the second volume and supplying the build material to the first volume.

19. The transport device of claim 18, comprising:
a bottom;
sidewalls extending up from the bottom;
the build platform positioned within the sidewalls; and
the second volume bounded at least in part by the build platform and the sidewalls.

20. The transport device of claim 19, wherein the bottom and the sidewalls define a compartment divided by the build platform into the first volume below the build platform and the second volume above the build platform.

* * * * *